(12) United States Patent
Li et al.

(10) Patent No.: US 12,309,242 B2
(45) Date of Patent: May 20, 2025

(54) ON-CHIP LINK ANALYSIS

(71) Applicant: Microsemi Storage Solutions Ltd., Vancouver (CA)

(72) Inventors: Bin Li, Surrey (CA); Richard David Sodke, Kelowna (CA); Robert Kristian Watson, Burnaby (CA)

(73) Assignee: Microsemi Storage Solutions Ltd., Vancouver (CA)

( * ) Notice: Subject to any disclaimer, the term of this patent is extended or adjusted under 35 U.S.C. 154(b) by 0 days.

(21) Appl. No.: 17/648,632

(22) Filed: Jan. 21, 2022

(65) Prior Publication Data

US 2022/0239763 A1 Jul. 28, 2022

Related U.S. Application Data

(60) Provisional application No. 63/140,656, filed on Jan. 22, 2021.

(51) Int. Cl.
*H04L 69/00* (2022.01)
*H04L 47/32* (2022.01)

(52) U.S. Cl.
CPC ............ *H04L 69/02* (2013.01); *H04L 47/32* (2013.01)

(58) Field of Classification Search
CPC ................................ H04L 47/32; H04L 69/02
See application file for complete search history.

(56) References Cited

U.S. PATENT DOCUMENTS

| | | |
|---|---|---|
| 7,173,943 B1 | 2/2007 | Borchew et al. |
| 7,567,517 B2 | 7/2009 | Mezer |
| 7,844,690 B1 * | 11/2010 | Durham .................. H04L 69/18 709/223 |
| 8,131,840 B1 | 3/2012 | Denker |
| 9,100,324 B2 | 8/2015 | Reeves |
| 9,465,769 B1 | 10/2016 | Leong et al. |
| 10,613,963 B2 * | 4/2020 | Carosa ...................... H04L 9/40 |
| 2002/0196789 A1 * | 12/2002 | Patton ..................... H04L 1/188 370/216 |
| 2003/0126508 A1 * | 7/2003 | Litt ......................... G06F 11/25 714/39 |
| 2004/0181740 A1 * | 9/2004 | Tomaru ..................... H04L 1/18 714/776 |
| 2005/0047434 A1 | 3/2005 | Hopkins |
| 2009/0082982 A1 | 3/2009 | Cain |
| 2010/0251001 A1 | 9/2010 | Drescher et al. |
| 2013/0067127 A1 * | 3/2013 | Hopgood ................ G06F 13/00 710/104 |
| 2014/0122696 A1 | 5/2014 | Gronlund |

(Continued)

FOREIGN PATENT DOCUMENTS

CN 104820637 A 8/2015

OTHER PUBLICATIONS

International Search Report from International Application No. PCT/IB2022/050563, mailed Apr. 27, 2022, 5 pages.

(Continued)

*Primary Examiner* — Zhensheng Zhang

(74) *Attorney, Agent, or Firm* — TraskBritt

(57) ABSTRACT

One or more examples relate to an on-chip protocol analyzer provided at a physical layer of a communication interface to receive information about link control process data carried by a communication system to or from a protocol control logic of the communication interface.

22 Claims, 10 Drawing Sheets

(56) References Cited

U.S. PATENT DOCUMENTS

| | | | |
|---|---|---|---|
| 2017/0123896 A1* | 5/2017 | Baek | G06F 11/1076 |
| 2017/0207987 A1 | 7/2017 | Kelly et al. | |
| 2018/0205477 A1* | 7/2018 | Yang | H04J 3/0667 |
| 2019/0044840 A1 | 2/2019 | Agrawal et al. | |
| 2019/0353696 A1 | 11/2019 | Hsu et al. | |
| 2020/0027556 A1* | 1/2020 | Xie | G16H 20/10 |
| 2020/0244562 A1 | 7/2020 | Paneah et al. | |

OTHER PUBLICATIONS

International Written Opinion from International Application No. PCT/IB2022/050563, mailed Apr. 27, 2022, 7 pages.

\* cited by examiner

ON-CHIP LINK ANALYSIS

CROSS-REFERENCE TO RELATED APPLICATIONS

This application claims the benefit under 35 U.S.C. § 119 (e) of the priority date of U.S. Provisional Patent Application Ser. No. 63/140,656, filed Jan. 22, 2021, the contents and disclosure of which is hereby incorporated herein in its entirety by this reference.

TECHNICAL FIELD

One or more examples relate, generally, to communication links and communication link analysis. One or more examples relate, generally, to on-chip link analysis.

BACKGROUND

When parties engage in a transaction to form or adjust a serial communication link (each party in such a transaction referred to herein as a "linking device"), they "negotiate" a number of parameters such as a data rate and data width at which to communicate. During a negotiation, the linking devices inform each other about their respective capabilities and then agree on parameters for a communication link based at least in part on their common capabilities. At the physical layer (PHY) of a device, such a link control process is typically referred to as link initialization, training, and re-training.

During a typical transaction to form a serial communication link, the serial communication link exhibits numerous link-states (including sub-states) and undergoes multiple link-state transitions. In each such state, one or both of the linking devices repeatedly send logically identical packets (referred to herein as "negotiation packets"), in some cases millions of packets per link-state transition, to the other linking device. Such negotiation packets inform the receiving linking device about the sending linking device's current state (state information), capabilities (capability information), request/confirm/reject a move to a next state (state transition information), or request/confirm/reject transmitter or receiver parameters (transmission parameter information), without limitation. By way of non-limiting example, during link training and initialization (i.e., a negotiation) to set up a PCIe link, millions of physical layer packets commonly referred to as Ordered-Sets (i.e., negotiation packets) are exchanged between neighboring devices (i.e., linking devices).

Issues can arise during a negotiation that should be addressed in order to meet or exceed link quality requirements (e.g., in a protocol specification, without limitation) such as bit-error limits. As a non-limiting example, data integrity is typically difficult to maintain during a negotiation. Linking devices often end up at data rates or data widths different than what they expected, which can cause data integrity issues and other errors. So, prospective linking devices often have to undergo multiple recovery processes before establishing a stable communication link. Moreover, in some cases a stable communication link is not established.

Link analyzers are sometimes used to capture information that can be analyzed to understand issues that arise during negotiations or with a communication link more generally. A serial communication link can be coupled to an external link analyzer (i.e., external to the chip or electronic systems that include the linking devices and transmission mediums there between) that captures information about negotiation packets. Records of the individual negotiation packets, types of negotiation packets, and flow thereof can be used to identify data integrity issues or other errors and debug a negotiation more generally.

In a typical arrangement, an external link analyzer is inserted in a communication path of linking devices. The external link analyzer receives negotiation packets, stores information about unfiltered or filtered negotiation packets and link status at an external storage device (i.e., external to the chip or electronic system that includes the linking device, but optionally internal to the external link analyzer). While earlier generations of link analyzers probed signals on a transmission medium, later generations re-drive the signals on the transmission medium to re-send the negotiation packets. Stored information about negotiation packets is referred to herein as a "trace."

Serializer/Deserializer (SerDes) is a pair of functional blocks for converting data between serial and parallel interfaces to provide for data transmission over a single line or a differential pair. "Serializing" refers to a process of moving data from parallel transmission medium (e.g., a parallel bus, without limitation) to a serial transmission medium (e.g., a single wire or differential pair, without limitation), and "de-serializing" refers to a process of moving data from a serial transmission medium to a parallel transmission medium.

SerDes often form at least a part of the circuitry that implements the physical media attachment (PMA) layer of a PHY for a serial communication link. For example, the Peripheral Component Interconnect Express (PCIe) bus is a serial communication link under specification by the Peripheral Component Interconnect Special Interest Group. PCIe specifies a PMA layer that includes a SerDes—among other circuitry.

Increasingly, serial communication interfaces are required to accommodate increasingly higher data rates. For example, early revisions of PCIe specified a data rate of 2.5 Giga transfers per second (GT/s) and later revisions specified 8, 16, 32 and 64 GT/s data rates. Notwithstanding these increases in data rates, SerDes are expected to meet or exceed low thresholds for bit errors specified for high-speed serial communication links such as PCIe, Compute Express Link (CXL) bus, and Universal Serial Bus (USB) 2.0 and later evolutions of USB, without limitation. The inventors of this disclosure appreciate that it is increasingly desirable to capture accurate information about link states and transitions to detect issues that arise and understand those issues.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
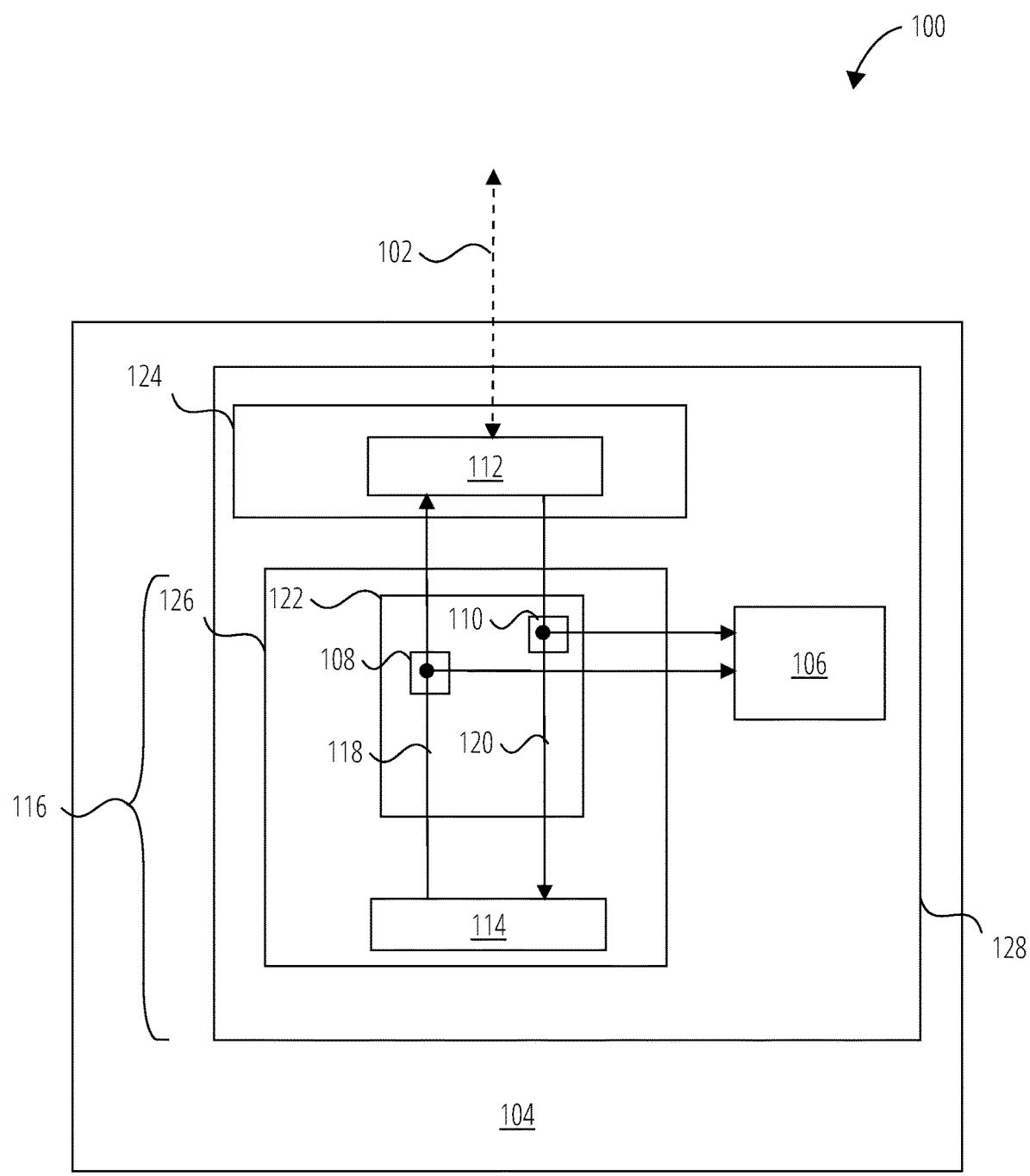
FIG. 1 is a block diagram depicting an apparatus that includes on-chip link analysis, in accordance with one or more examples.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and circuitry described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flow diagram, a structure diagram, or a block diagram. Although a flow diagram may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner.

In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, any relational term, such as "over," "under," "on," "underlying," "upper," "lower," etc., is used for clarity and convenience in understanding the disclosure and accompanying drawings and does not connote or depend on any specific preference, orientation, or order, except where the context clearly indicates otherwise.

In this description the term "coupled" and derivatives thereof may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The term "connected" may be used in this description interchangeably with the term "coupled," and has the same meaning unless expressly indicated otherwise or the context would indicate otherwise to a person having ordinary skill in the art.

One or more examples relate, generally, to link analyzers, which is a module, component or device configured to capture information about a communication link. A protocol analyzer is a non-limiting example of a link analyzer that captures data carried over a protocol link (such as a PCIe link, a CXL link, or a USB link, without limitation). A bus analyzer is a non-limiting example of a protocol analyzer.

The inventors of this disclosure appreciate a number of disadvantages and opportunities for improvement over external link analyzers. As a non-limiting example, when external link analyzers, probe or re-drive a transmission medium of a serial communication link, such probing or re-driving may change the signal integrity of the signal path and affect link characteristics. Affecting link characteristics in turn may affect data integrity, link-state transitions, or an overall negotiation between linking devices. The inventors of this disclosure appreciate that such an affect compromises data integrity, hampering or even preventing proper debug of a link issue.

As another non-limiting example, an external link analyzer typically requires an interposer at the location where the external link analyzer is inserted, which interposer taps the signals on the serial line and routes/drives the tapped signals to another path of the external link analyzer located with an external storage device. The signal trace is stored at an external storage device, typically a memory such as Double Data Rate (DDR) Random-Access Memory (RAM). As a non-limiting example, in a typical arrangement, the quantity of negotiation trace stored by an external link analyzer may exceed tens of gigabytes per negotiation. So, in such arrangements an external storage device having sufficient storage capacity is typically required to hold the trace. Storage devices having sufficient storage capacity take up space.

As yet another non-limiting example, limitations with routing of signals, layout of physical connections between linking devices, lack of physical connections between linking devices, and/or a lack of an access point for an external analyzer, may make it physically impossible to place an external analyzer's interposer in the data path of a link, and so hamper or render it impossible to debug in-system or on-board link issues at linking devices.

As yet another non-limiting example, the data that an external link analyzer typically captures and interprets is its own SerDes data, which data may not represent what was actually seen by the SerDes of a linking device.

One or more examples relate, generally, to on-chip link analysis and an on-chip protocol analyzer. In some examples, the placement of a link analyzer and location of its coupling along a signal path of a serial communication link may reduce affected link characteristics and compromising data integrity more generally as compared, for example, to external link analyzers. In some examples, on-chip link analysis may include real-time filtering of packets and data compression to reduce the size of the trace and such reduced size trace may be more easily stored at an on-chip memory.

Compression algorithms may be configurable, and serial communication protocol aware. In one or more examples, a compression algorithm that is serial communication protocol aware may include logic for identifying types of serial communication protocol packets and filtering out some types of protocol packets that are not interesting or passing only some types of protocol packets that are interesting, logic for ignoring some portions of protocol packet contents (e.g., ignoring specific fields of protocol packets, without limitation) or for capturing some portions of protocol packets contents that are interesting, and logic for determining some protocol packets or contents of protocol packets are logically identical or that they are not logically identical.

FIG. 1 is a block diagram depicting an apparatus 100 that includes on-chip link analysis, in accordance with one or more examples. Apparatus 100 includes a linking device 104 and an optional transmission medium 102 to couple linking device 104 with other linking devices (other linking devices not depicted). Linking device 104 includes physical layer 128 ("PHY 128") of communication interface 116, second sublayer 124, first sublayer 126, and on-chip protocol analyzer 106.

Protocol control logic 114 and parallel communication system 122 are provided at first sublayer 126 of PHY 128 (e.g., a logical sublayer, without limitation), and SerDes 112 is provided at second sublayer 124. SerDes 112 is provided at second sublayer 124 (e.g., an electrical sublayer, without limitation) to convert serialized data to parallelized data and to convert parallelized data to serialized data and push serialized data onto transmission medium 102 and pulls serialized data off of transmission medium 102. Communication interface 116 is circuitry to facilitate electronic communication between devices such as linking device 104 and another linking device, optionally via circuitry that implements some or a totality of a protocol such as PCIe, CXL or USB, without limitation. SerDes 112 is an interface between parallel communication system 122, which is a communication system via which packets are transmitted internally at communication interface 116 and a serial communication system with which communication interface 116 interfaces.

Pre-serialization portion 108 and post-deserialization portion 110 are portions of parallel communication system 122 that carry outgoing and incoming negotiation packets (and optionally other types of packets) to or from protocol control logic 114. Protocol control logic 114 implements state machines that control a link-state of a serial communication link and link-state transitions thereof (and optionally other processes for communication links). Protocol control logic 114, and the state machines it implements, may be, or be a part of, a protocol core (e.g., a PCIe core, CXL core, or USB core, without limitation).

Protocol control logic 114 implements state machines and control link-state transitions at least partially in response to negotiation packets and data therein it sends and receives via parallel communication system 122. While on-chip protocol analyzer 106 is coupled to parallel communication system 122, on-chip protocol analyzer 106 may observe substantially the same negotiation packets that protocol control logic 114 sends and receives.

On-chip protocol analyzer 106 (which may also be referred to herein as "capture device 106") is coupled to receive packets carried between SerDes 112 and protocol control logic 114 via parallel communication system 122. Such packets may include negotiation packets that, among other things, may include process control data such as link training data, without limitation. On-chip protocol analyzer 106 is coupled with pre-serialization portion 108 of outgoing signal path 118 and post-deserialization portion 110 of incoming signal path 120. Pre-serialization portion 108 and post-deserialization portion 110 may include the same or different portions of communication busses of parallel communication system 122 that carry valid data to/from SerDes 112, the valid data locked (e.g., a receiver of the data via the bus has adjusted such that it correctly receives a bitstream, without limitation) to the respective buses. Inputs of on-chip protocol analyzer 106 for receiving negotiation packets may be coupled with pre-serialization portion 108 and post-deserialization portion 110 via, as a non-limiting example, electrical taps.

Coupling of on-chip protocol analyzer 106 to parallel communication system 122 in such a manner as to observes substantially the same negotiation packets and other link control process data that are seen protocol control logic 114, is referred to herein as being "tightly coupled,"—i.e., on-chip protocol analyzer 106 is tightly coupled with communication interface 116.

Figure 2:
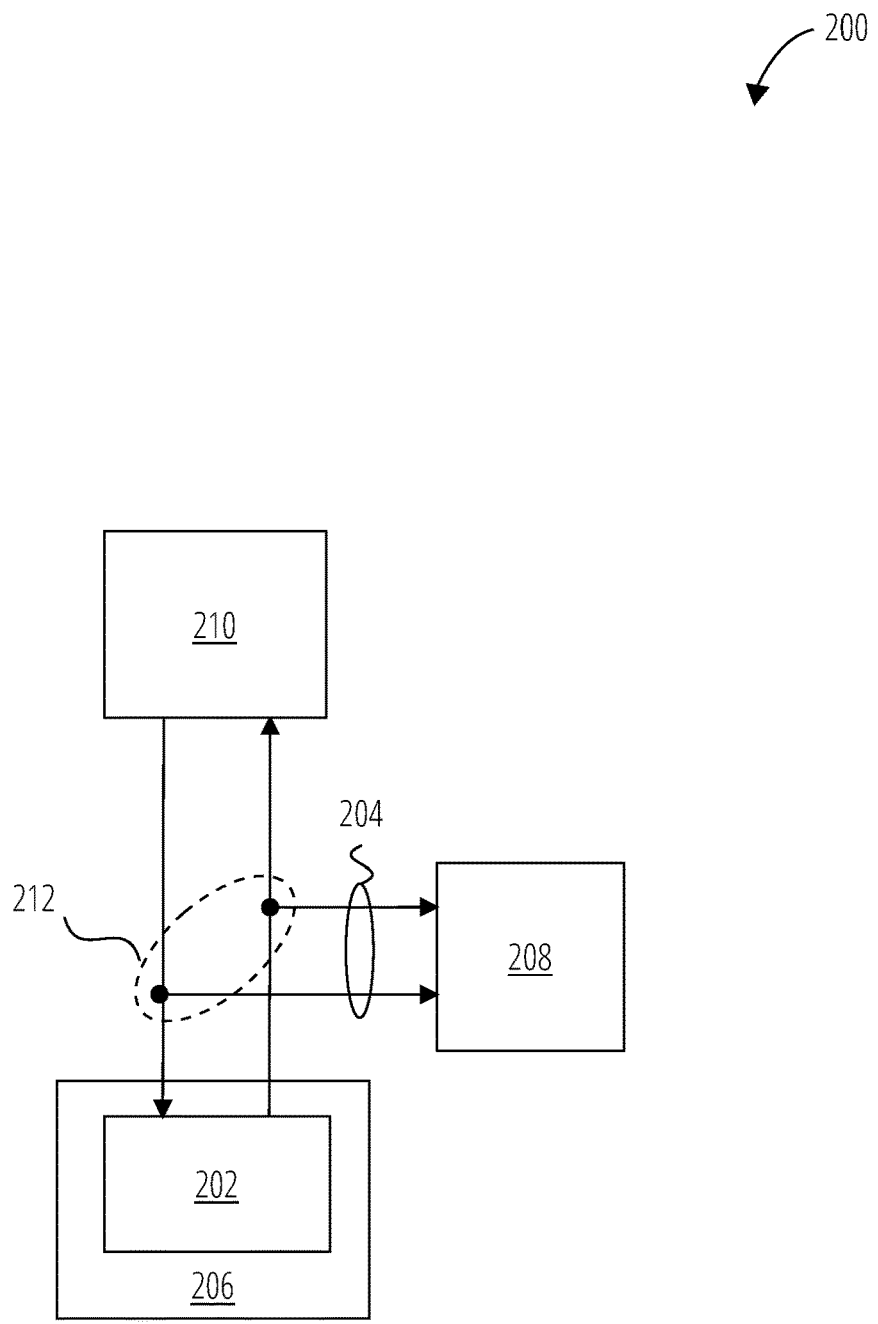
FIG. 2 is a block diagram depicting an apparatus that includes on-chip PCIe protocol analysis, in accordance with one or more examples.

FIG. 2 is a block diagram depicting an apparatus 200 that includes on-chip PCIe link analysis at a PCIe interface, in accordance with one or more examples. Apparatus 200 is a specific non-limiting example of apparatus 100 for PCIe.

PCIe link control state machine 202 of PCIe core 206 may be implemented, as a non-limiting example, via protocol control logic 114 of FIG. 1. As a non-limiting examples, PCIe link control state machine 202 may be, or execute some or a totality of the functions of a link training and status state machine (LTSSM) or a portion thereof such as a link-initialization state machine (LISM) or a link-retraining state machine (LRTSM), without limitation.

On-chip protocol analyzer 208 is coupled (via electrical taps 212) to captures the link control process data 204 carried between SerDes 210 and PCIe link control state machine 202. In this manner, on-chip protocol analyzer 208 is a PCIe link analyzer. Link control process data 204 may be directly or indirectly captured from Ordered Sets on a communication path between SerDes 210 and PCIe link control state machine 202, which are the negotiation packets traded by linking devices to train and initialize PCIe links.

When an LTSSM executes at PCIe core 206 (i.e., PCIe link control state machine 202 is an LTSSM), some or a totality of the Ordered Sets that on-chip protocol analyzer 208 captures are link-training Ordered Sets. When a LISM executes at PCIe core 206 (i.e., PCIe link control state machine 202 is an LISM), some or a totality of the Ordered Sets that on-chip protocol analyzer 208 captures are link-initialization Ordered Sets. When an LRTSM executes at PCIe core 206 (i.e., PCIe link control state machine 202 is an LRTSM), some or a totality of the Ordered Sets that on-chip protocol analyzer 208 captures are link re-training Ordered Sets.

Some or a totality of Ordered Sets captured by on-chip protocol analyzer 208 may include information about link control process data such as information about one or more states of a PCIe link and state transitions of the same, without limitation. In one or more examples, information about other link process control data (e.g., link initialization data, link training data, and link re-training data, without limitation) and link state status data may be captured without exceeding the scope.

Figure 3:
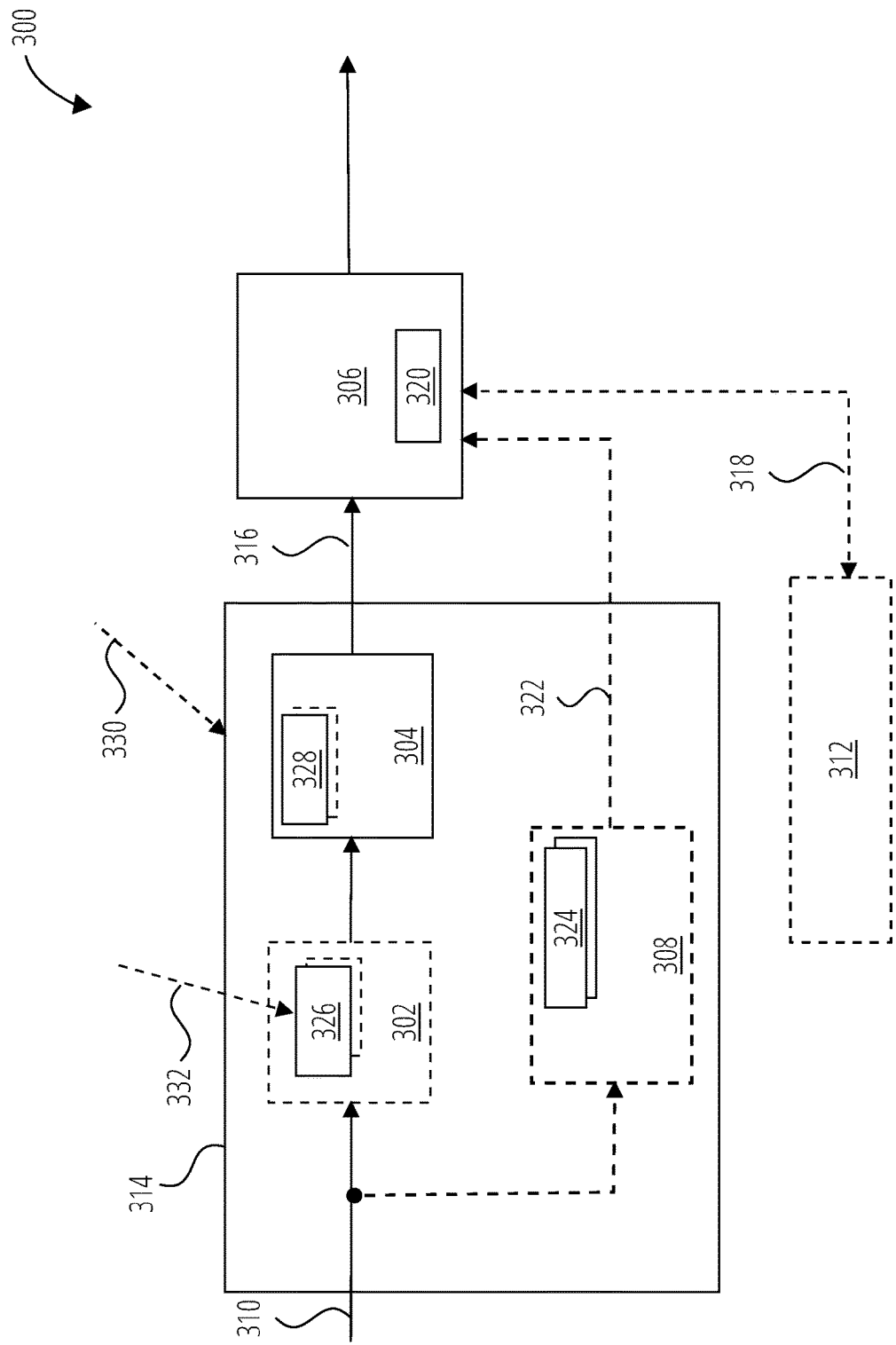
FIG. 3 is a block diagram depicting an on-chip protocol analyzer, in accordance with one or more examples.

FIG. 3 is a block diagram depicting an on-chip protocol analyzer 300, in accordance with one or more examples. On-chip protocol analyzer 300 includes capture circuitry 314, on-chip storage device 306, and optional status monitoring logic 312. Capture circuitry 314 may include record generation logic 304 and one or more of optional triggering logic 308 and optional filtering logic 302.

Record generation logic 304 is to record information (e.g., generate records, without limitation) about repeated, logically identical, packets into one or more records 320 of on-chip storage device 306. The contents of a record generated by record generation logic 304 may include information about how, when, or under what circumstance a packet was, or multiple logically identical packets were, repeatedly sent. As a non-limiting example, a record may include information about a repeated packet contents, counts or duration of repeating packets, and additional information about a packet such as a timestamp of when it was captured or of when it was sent (e.g., sent by a protocol control logic, without limitation).

In one or more examples, record generation logic 304 may include one or more reducing logic 328 to identify related packets (e.g., related to debug of an issue related to a protocol link, without limitation) and then "compress" logically identical packets of those identified packets into the one or more records 320 that includes information how, when, or under what circumstance multiple instances of a logically identical packet were sent.

Records 316, which may include captured information such as packets 310, contents of packets 310, information about or generated at least partially based on packets 310, or records generated by record generation logic 304, are stored at on-chip storage device 306 as trace. On-chip storage device 306 may be, as a non-limiting example, an on-chip random-access-memory (RAM). Additionally or alternatively to on-chip storage device 306, trace may be stored at off-chip storage device (not shown) in examples where an interface is available to communicate the trace off-chip.

In some examples, record generation logic 304 or reducing logic 328, more specifically, may include a lossless compression algorithm (not depicted) to encode (i.e., using fewer bits than the original trace) some or a totality of the trace. An original trace may optionally be recovered from the compressed trace utilizing a decompression algorithm—at the cost of logic complexity.

Records 320 generated by record generation logic 304 may include one or more fields. Non-limiting examples of types of fields include Ordered Set content, a frequency count, speed, time stamp, when the Ordered Set was generated relative to a directional channel (e.g., a lane, without limitation), meta status, and cryptographic data (e.g., elliptical curve cryptography data, without limitation).

In one or more examples, specific fields and groups of fields may be selectively enabled at on-chip protocol analyzer 300 based on a capture mode. Capture modes may optionally be selectively enabled or disabled at least partially in response to instruction 330. For example, in a "snapshot" capture mode, upon a triggering event information may be recorded until all allocated memory at on-chip storage device 306 is used. In an "Ordered Set" capture mode, all types of Ordered Set are filtered out by default and on-chip protocol analyzer 300, and capture circuitry 314 more specifically, capture of one or more types of Ordered Set (discussed below).

Capture circuitry 314 may include optional triggering logic 308 to generate a code 322 each time a triggering condition is detected by one or more programmable triggers 324. An event giving rise to a triggering condition is referred to as a "triggering event." Respective ones of programmable triggers 324 may be set to detect a specific triggering condition and generate respective code 322 responsive thereto. Non-limiting examples of triggering conditions and programmable triggers 324 to trigger based thereon include:

Ordered Set type match: match on packet content, packet type, or other information in a packet (e.g., negotiation packets that are known to cause or result from specific link-state transition or match on the output of a link training status state machine (LTSSM) monitor, without limitation);

Ordered Set pattern match: match on content and a value or mask that was predetermined or preconfigured;

Trigger IN: trigger on all trigger-enabled lanes and match the same pattern or Ordered Set Type; and.

Code 322 may indicate a lane or lanes that were triggered, a lane that was triggered first, or a reason for the trigger and optionally stored with records 320 at on-chip storage device 306.

Optional filtering logic 302 is to filter-out (e.g., drop or suppress signaling of, without limitation) irrelevant packets or information among packets 310. Generally speaking, "irrelevant packets and information" are packets or fields of packets that are not sufficiently relevant to debugging an issue with a communication link (e.g., a PCIe link, CXL link, or USB link, without limitation).

As a non-limiting example of an insufficiently relevant packet in the case of PCIe is a packet that exhibits a frequency-of-repeat that is below a predetermined threshold (i.e., a predetermined number of repeats). Filtering logic 302 may include one or more match filters 326 respectively to perform specific types of filtering (i.e., filter based on specific criteria associated with types of irrelevant packets or information) that may optionally be selectively enabled or disabled at least partially in response to further instruction 332.

As a non-limiting example, one or more match filters 326 may be to perform Ordered Set type filtering. In Ordered Set type filtering, all types of Ordered Set are filtered out by default, and respective match filters 326 are selectively disabled to permit specific types or combination of types of Ordered Set to pass, such as Training Sequence (TS) Ordered Set, Fast Training Sequence (FTS) Ordered Set, control skip (SKP) Ordered Set, Electrical Idle Exit Ordered Sets (EIEOS), DC balance symbols, and error Ordered Set, without limitation.

As a non-limiting example, during debug of a training sequence for a PCIe link, TS Ordered Sets are interesting while EIEOS and DC balance symbols are generally not interesting. So, filtering may be turned off for TS Ordered Sets and left on for other types of Ordered Set such as EIEOS and DC balance symbols. As another example, during an EIEOS debug, EIEOS may be interesting so filtering may be turned off for EIEOS and left on for other types of Ordered Set. As another example, during debug of DC balanced related issues (e.g., wrong DC balance coding, without limitation) in an AC coupled serial link, filtering may be turned off for DC balance symbols and left on for other Ordered Set.

As non-limiting examples, filtering may be performed in response to detecting interleaved packets, specific packet fields, specific packet counts (to identify low frequency of repetition), or combinations and subcombinations thereof. Infrequent packets may be due to, as non-limiting example, corrupted data received when a receiver has not well adapted to the far end transmitter, for example, right after a port requested a new far end transmit preset value. Non-repeating/infrequent packets are understood by the inventors of this disclosure to not contribute to LTSSM state transition and so may be ignored.

Any suitable technique can be used to filter out uninteresting packets. For example, triggering logic 308 may generate a code 322 for each triggering event. A code 322 may be a valid data signal for downstream record generation logic 304. Filtering logic 302 may generate a signal that is a suppression signal for such a downstream valid data signal generated by the triggering logic 308.

In one or more examples, activation/deactivation control signals and parameter values may be controlled and provided during a debug session by a debug tool (e.g., a software application that enables a user to interface with a disclosed link analyzer, without limitation). In one or more examples, activation/deactivation control signals and parameter values may be provided by a control register (not shown) programmed for debug session or during setup for monitoring of protocol links in real-time.

On-chip storage device 306 may be coupled with triggering logic 308 to receive and store the codes 322 (e.g., as trace) generated by triggering logic 308. In one or more examples, storage activity by on-chip storage device 306 may be initiated automatically by on-chip storage device 306 in response to valid output at triggering logic 308 or a control signal generated by triggering logic 308. Such a control signal may, in some examples, inform the on-chip storage device 306 of an amount of information to be stored. In such examples, on-chip storage device 306 may set start/stop pointers of, as a non-limiting example, a circular buffer at least partially based on an amount of information indicated by the triggering logic 308.

On-chip protocol analyzer 300 may include optional status monitoring logic 312 to capture information about the status of the on-chip protocol analyzer 300 including that it filtered out certain types of packets. The captured control and status information 318 may be added to the contents of records 320 or stored elsewhere (e.g., at status registers, without limitation).

Sometimes the physical connections between linking devices include multiple channels (e.g., multiple wires, differential pairs, without limitation) that can be added as needed to a communication link to increase the data width of a data path or a portion thereof in a specific or different directions (e.g., toward or away from a protocol control logic, without limitation). In one or more examples, an on-chip protocol analyzer may be associated with a specific directional channel, and if multiple channels are included in each direction, then multiple on-chip protocol analyzers 106, 208 or 300 may be provided that are individually associated with respective ones of the multiple channels.

Figure 4:
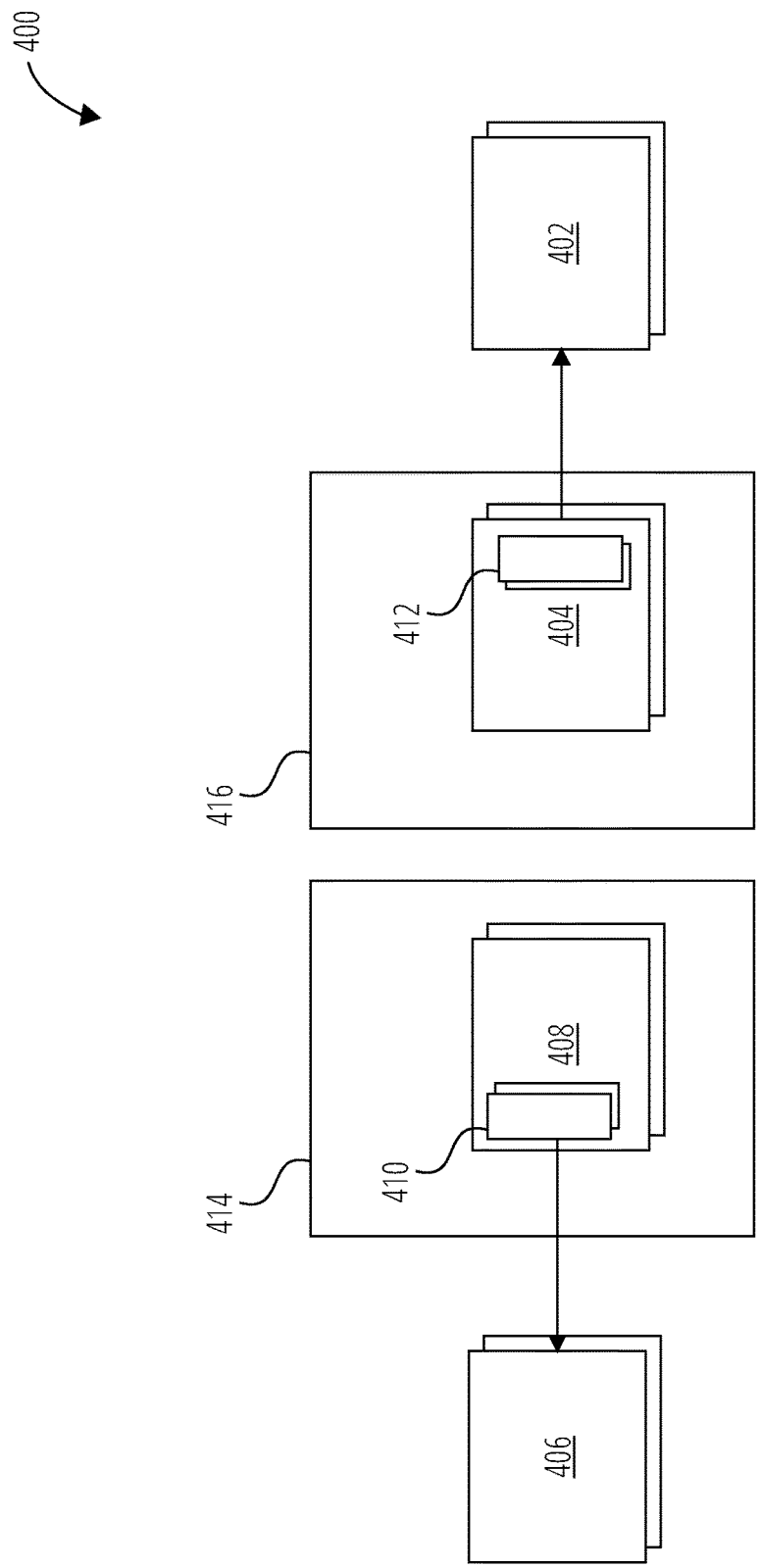
FIG. 4 is a block diagram depicting a logical sublayer of PHY in accordance with one or more examples.

FIG. 4 is a block diagram depicting a logical sublayer of PHY 400 in accordance with one or more examples. Logical sublayer of PHY 400 includes one or more second link analyzers 406 coupled with one or more pre-serialization portions 410 of one or more lanes 408 available for outgoing path 414, one or more first link analyzers 402 coupled with one or more post-deserialization portions 412 of one or more lanes 404 available for incoming path 416. Additional channels and additional link analyzers may be included without exceeding the scope of this disclosure.

In some examples, a disclosed on-chip protocol analyzer may be provided with any device that could affect signal or data integrity of a communication link. As a non-limiting example, channel extension devices, such as re-drivers and re-timers, are sometimes used to extend the "reach" of a physical channel. Re-drivers typically include analog components for boosting the high-frequency portion of a signal to counteract attenuation. Re-timers typically include mixed-signal components, analog and digital, for recovering data and a clock, and then transmitting a fresh copy of the data with a clean clock. An extension device configured as a re-timer is typically protocol aware and may participate in a communication link protocol; may include tools for assessing electrical performance and protocol performance; and may adapt its receive and transmit equalizers to match characteristics of a channel.

Figure 5:
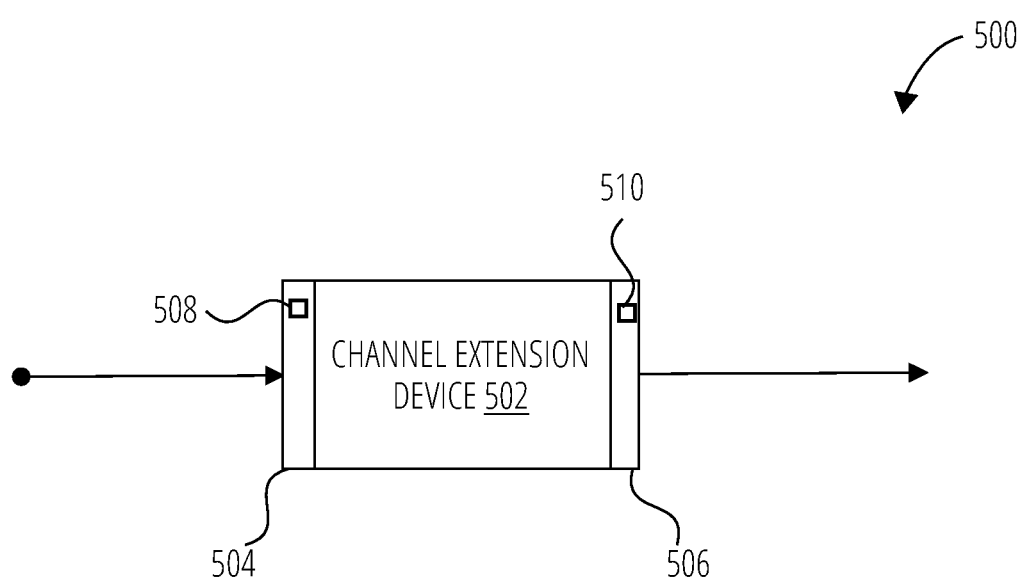
FIG. 5 is a block diagram depicting a communication link portion that includes a channel extension device in accordance with one or more examples.

FIG. 5 is a block diagram depicting a communication link portion 500 that includes a channel extension device 502 in line with a communication link that includes communication interface 504 and communication interface 506 each configured as a communication interface 506. Communication interface 504 and communication interface 506 may include on-chip protocol analyzers 508 and 510, respectively configured as an on-chip protocol analyzer 106 or 300, discussed herein.

In an example where communication interface 506 is included in a channel extension device, link control process data 204 may include the link control process data discussed herein, as well as information about equalization applied to a channel, electrical performance, and protocol performance.

Figure 6:
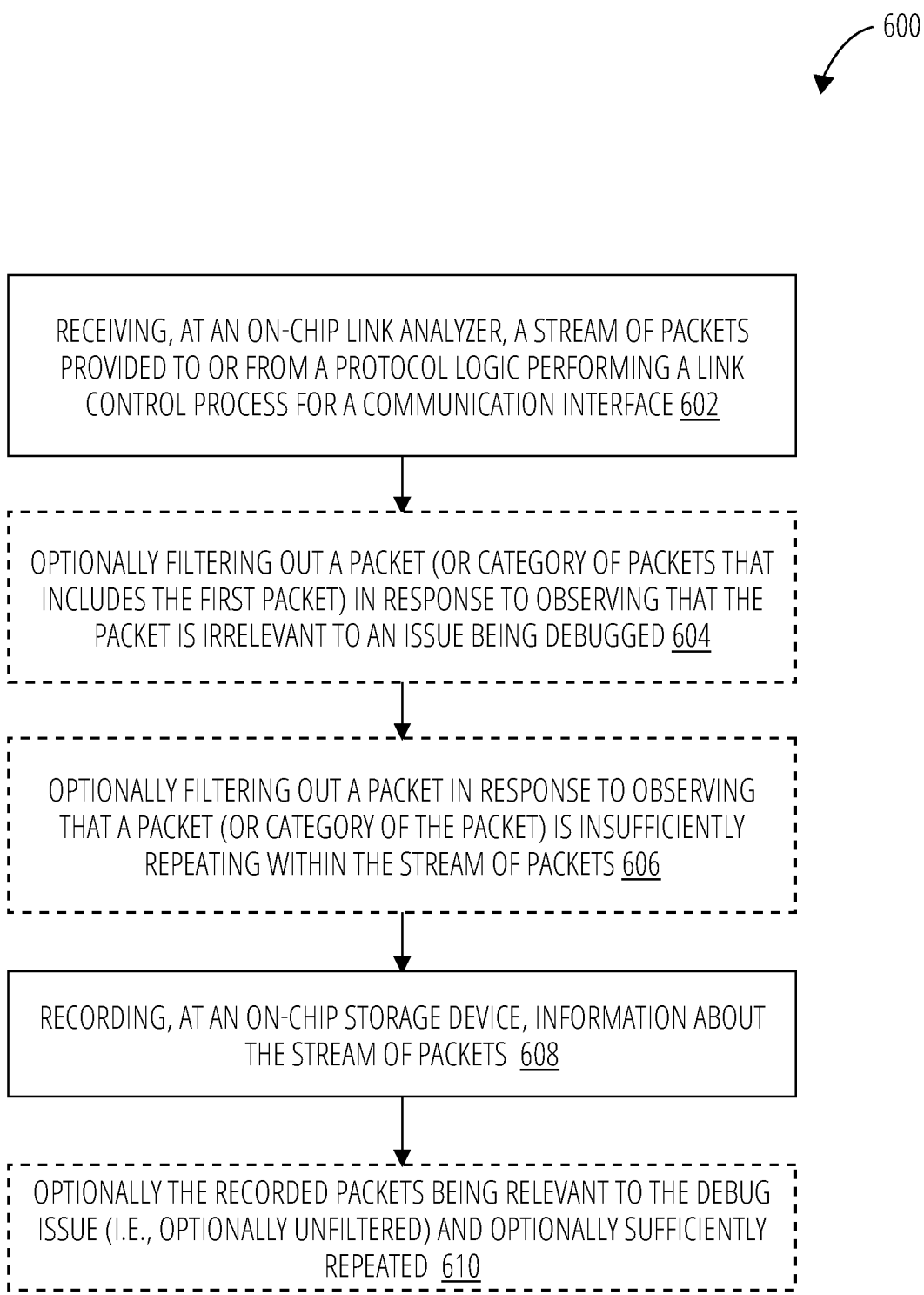
FIG. 6 is a flow chart depicting a process for capturing information about a negotiation between linking devices, in accordance with one or more examples.

FIG. 6 is a flow chart depicting a process 600 for capturing information about a negotiation between linking devices, in accordance with one or more examples.

At operation 602, process 600 receives a stream of packets provided to or from a protocol control logic performing a link control process for a communication interface. The stream of packets are captured by an on-chip protocol analyzer such as on-chip protocol analyzer 300, or on-chip protocol analyzer 106 coupled with communication interface 116 via couplings to portions of a parallel communication system 122 of communication interface 116.

At operation 604, process 600 optionally filters out a packet (or a category of packets that includes the packet) in response to observing that the packet, or a category of packets that includes the packet, is irrelevant to an issue being debugged.

At operation 606, process 600 optionally filters out a packet in response to observing that the packet is insufficiently repeating within the stream of packets. The second packet may or may not be relevant to an issue being debugged.

At operation 608, process 600 records, at an on-chip storage device, information about the stream of packets.

At operation 610, optionally the information about the stream of packets may be about unfiltered packets that are relevant to a debug issue and sufficiently repeated (i.e., a frequency of repetition exceeds a predetermined threshold).

Figure 7:
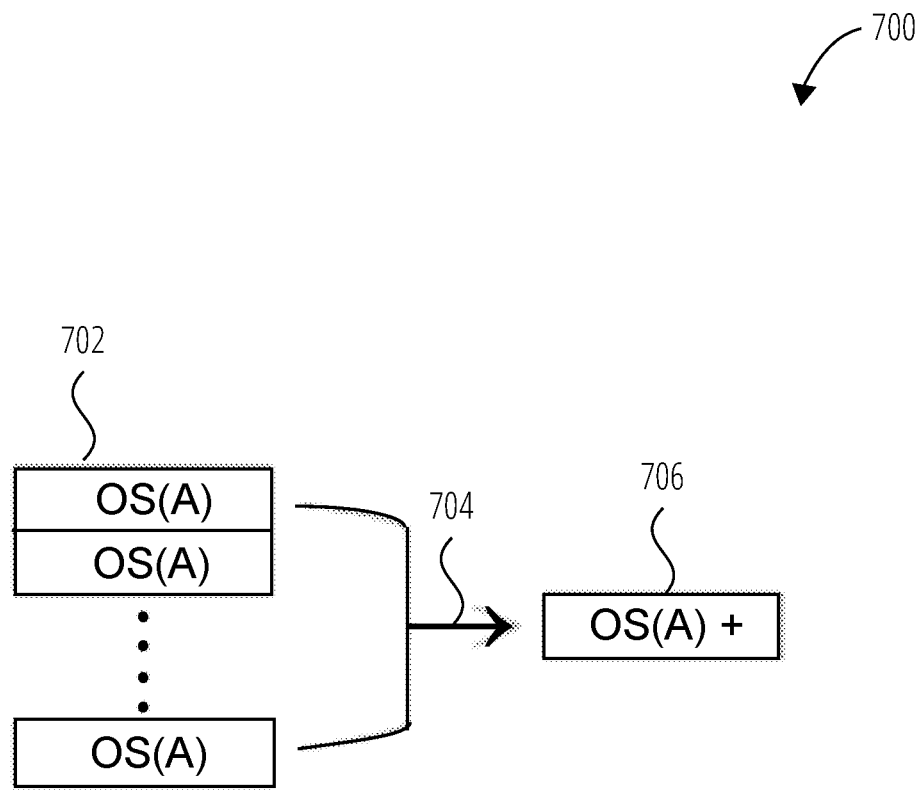
FIG. 7 is a diagram depicting a specific non-limiting example of reducing repeated logically identical packets, in accordance with one or more examples.

FIG. 7 is a diagram depicting a specific non-limiting example of reducing 700 repeated logically identical packets, in accordance with one or more examples. In this specific example, multiple repeated Ordered Sets 702, are each depicted as "OS(A)," and are reduced 704 into a single Ordered Set record 706 depicted as "OS(A)+." Ordered Set record 706 (i.e., "OS(A)+") may include information from Ordered Set(A) or status information, such as repeat counts or time information.

Notably, respective ordered sets "OS(A)" of multiple repeated Ordered Sets 702 may have a specified bit length, as a non-limiting example, 128 bits, and ordered set record 706 may have a specified bit length, as a non-limiting example, 200 bits. In a contemplated operation, the size of information may be reduced from a number of OS(A) in multiple repeated Ordered Sets 702×128 bits to 200 bits, the size of ordered set record 706, with the cost of logic complexity.

Figure 8A:
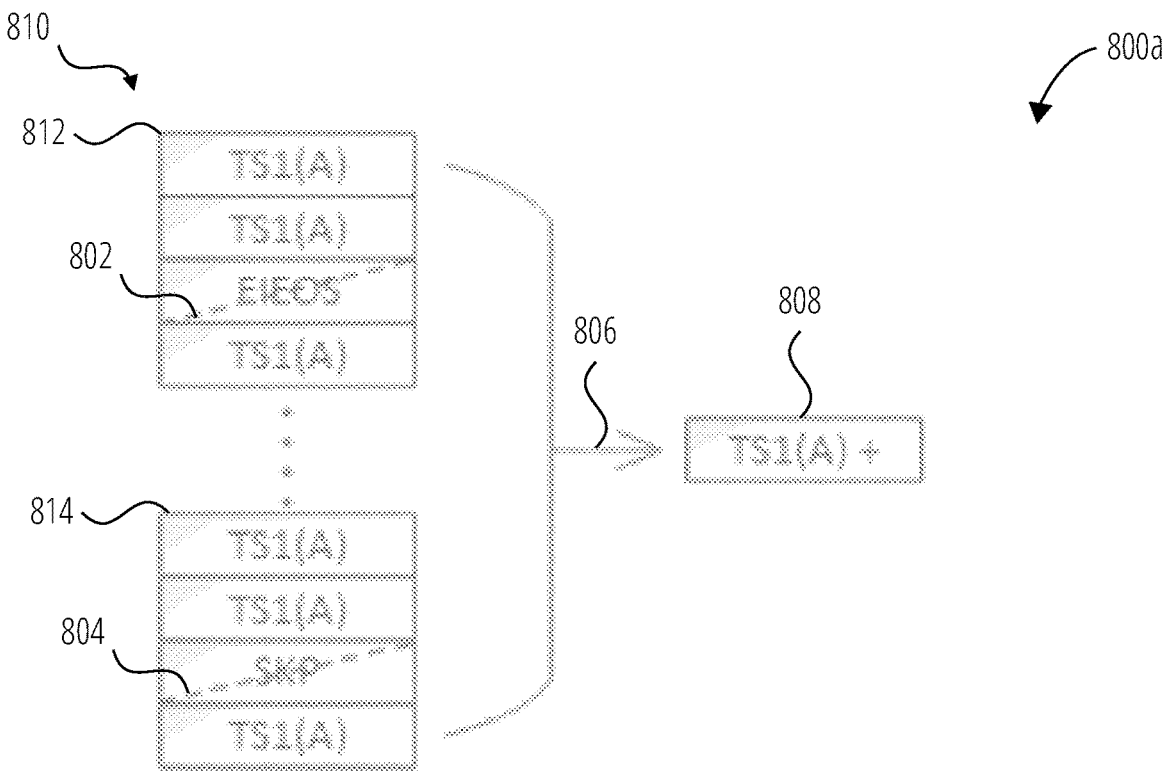
FIG. 8A is a diagram depicting filtering in accordance with one or more examples.
Figure 8B:
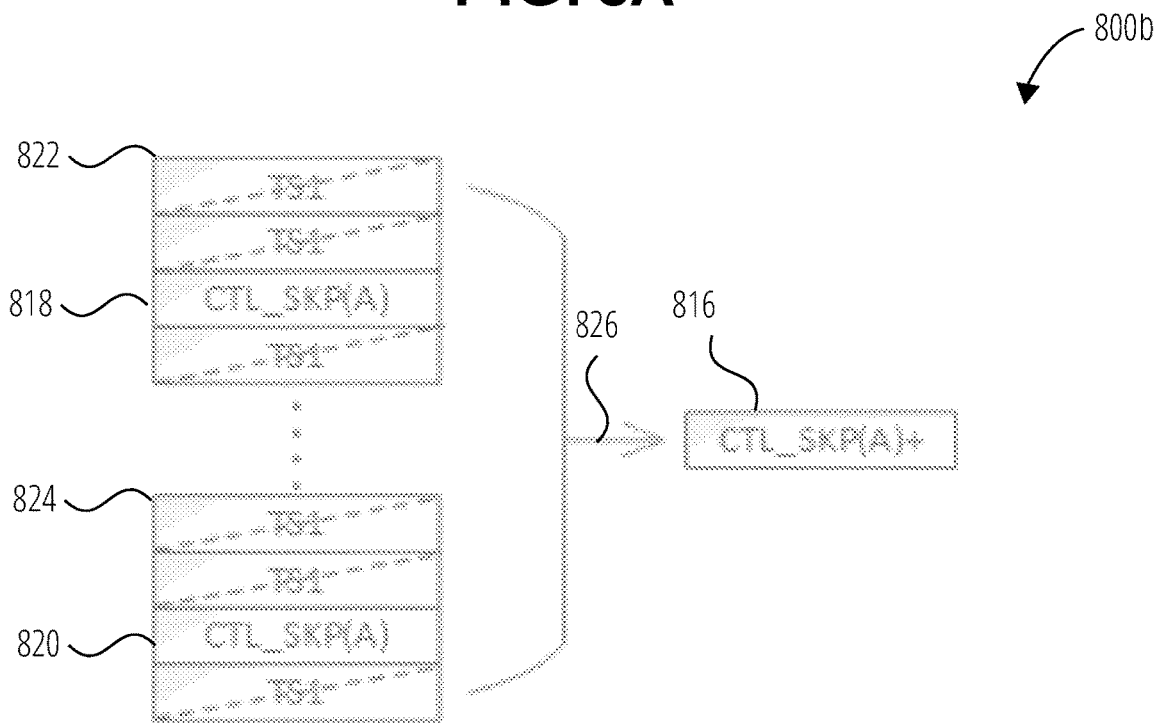
FIG. 8B is a diagram depicting filtering in accordance with one or more examples.

FIG. 8A and FIG. 8B are diagrams depicting a specific non-limiting example of interleaved filtering 800a and interleaved filtering 800b, respectively, of uninteresting packets. This may enable higher compression ratio than if such packets were not filtered. A first group 812 of Ordered Sets 810 and a second group 814 of Ordered Sets 810 include repeated but logically identical packets, respectively, the "TS1(A)" Ordered Sets depicted by FIG. 8A in each group. First group 812 of Ordered Sets 810 and a second group 814 of Ordered Sets 810 include uninteresting Ordered Set 804 and uninteresting Ordered Set 804, respectively. Uninteresting Ordered Set 802 is an EIEOS type Ordered Set and uninteresting Ordered Set 804 is a SKP (a DC balance symbol) type Ordered Set, in respective streams of repeated TS1(A) Ordered Sets. Record 808 is generated 806 at least partially based on respective Ordered Sets of first group 812 and second group 814 that aren't filtered out.

Disclosed examples provide support to filter out uninteresting information to increase compression ratio at on-chip protocol analyzer. As discussed above, a packet is uninteresting in one scenario (e.g., a specific debug issue such as depicted by FIG. 8A, without limitation) may be interesting in another scenario (e.g., a different specific debug issue such as depicted by FIG. 8B, without limitation). For example, EIEOS packets may be uninteresting when focused on TS debug (e.g., FIG. 8A), but EIEOS packets may be of interest in EIEOS debug while TS packets are uninteresting.

In the specific non-limiting example depicted by FIG. 8B, all Ordered Sets except Ordered Sets 818 and 820 (each a "CTL-SKP(A)" type Ordered Set) of first group 822 and second group 824, respectively, are filtered out. Record 816 is generated 826 at least partially based on Ordered Sets 818 and 820.

In another example, a specific filter logic block is not included, and instead the compression block implementing the protocol aware compression algorithm includes logic to skip/ignore interleaved uninteresting packets during compression. Or in another words, combined filtering and compression together.

Figure 9:
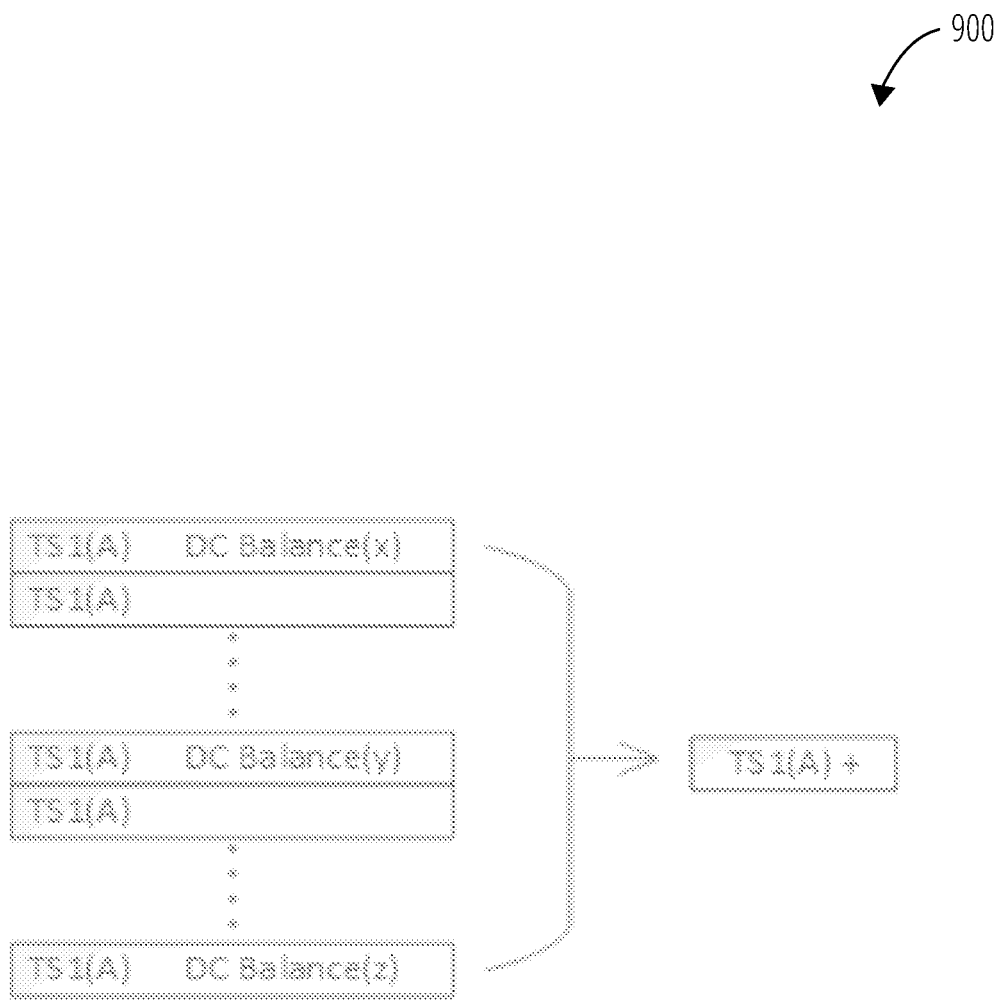
FIG. 9 is a diagram depicting a filtering and reducing in accordance with one or more examples.

FIG. 9 is a diagram depicting a filtering and reducing 900 in accordance with one or more examples. In the specific example, uninteresting information is ignored (here the DC Balance information) for purposes of determining whether the respective TS1(A) Ordered Sets are logically identical, and the logically identical "TS1(A)" type Ordered Sets are passed through a filter (not depicted), and record "TS1(A)+"

is generated from the TS1(A) Ordered Sets. Ignoring DC Balance information when determining if packets are logically identical allows higher compression ratio.

Figure 10:
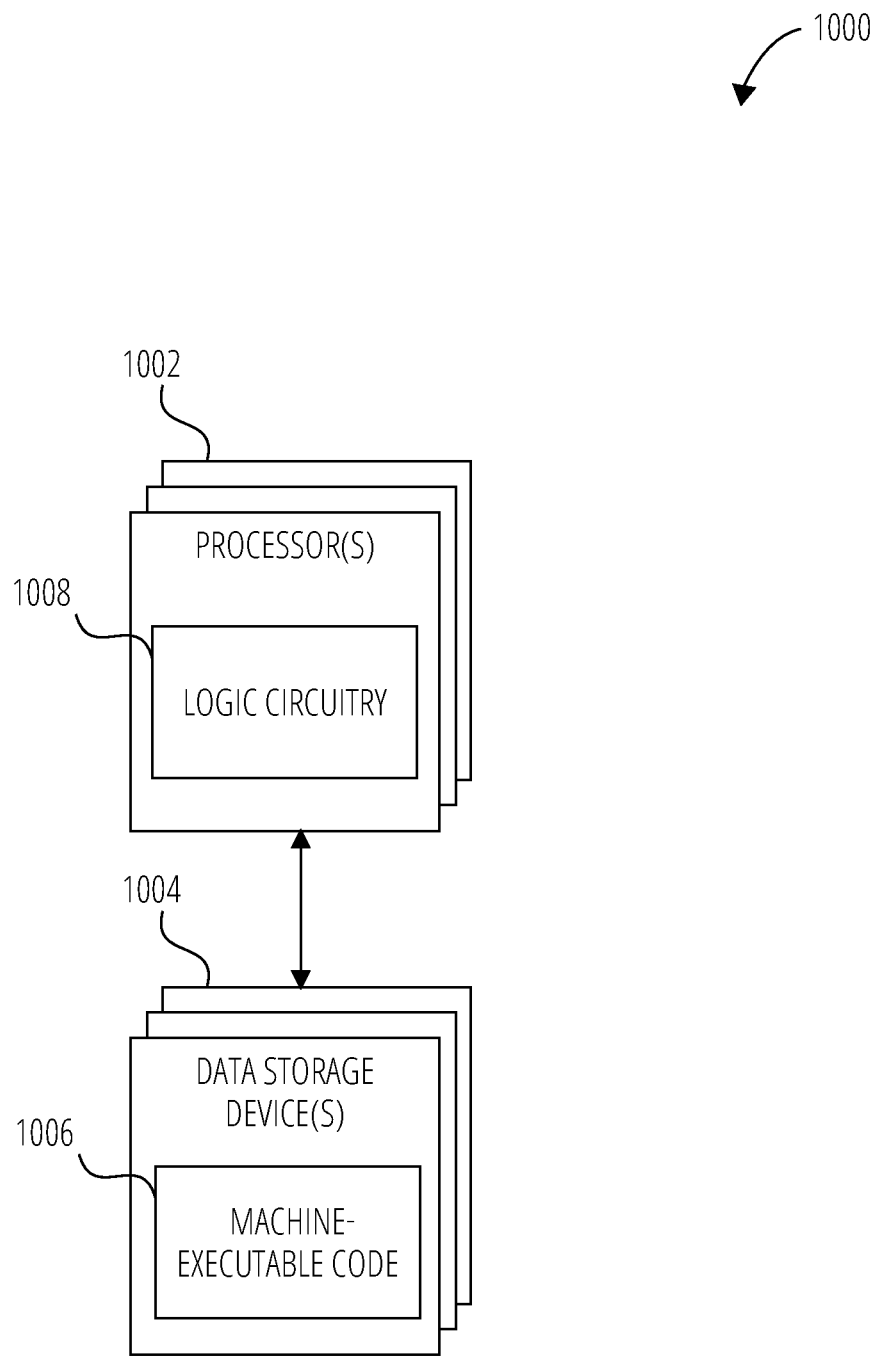
FIG. 10 is a block diagram of circuitry that, in some examples, may be used to implement various functions, operations, acts, processes, and/or methods disclosed herein.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 10 illustrates non-limiting examples of implementations of functional elements disclosed herein. In some examples, some or all portions of the functional elements disclosed herein may be performed by hardware specially configured for carrying out the functional elements.

FIG. 10 is a block diagram of circuitry 1000 that, in some examples, may be used to implement various functions, operations, acts, processes, and/or methods disclosed herein. The circuitry 1000 includes one or more processors 1002 (sometimes referred to herein as "processors 1002") operably coupled to one or more data storage devices (sometimes referred to herein as "storage 1004"). The storage 1004 includes machine-executable code 1006 stored thereon and the processors 1002 include logic circuitry 1008. The machine-executable code 1006 includes information describing functional elements that may be implemented by (e.g., performed by) the logic circuitry 1008. The logic circuitry 1008 is adapted to implement (e.g., perform) the functional elements described by the machine-executable code 1006. The circuitry 1000, when executing the functional elements described by the machine-executable code 1006, should be considered as special purpose hardware configured for carrying out functional elements disclosed herein. In some examples, the processors 1002 may be configured to perform the functional elements described by the machine-executable code 1006 sequentially, concurrently (e.g., on one or more different hardware platforms), or in one or more parallel process streams.

When implemented by logic circuitry 1008 of the processors 1002, the machine-executable code 1006 is configured to adapt the processors 1002 to perform operations of examples disclosed herein. For example, the machine-executable code 1006 may be configured to adapt the processors 1002 to perform at least a portion or a totality of the features and functions discussed with reference to apparatus 100, apparatus 200, on-chip protocol analyzer 300, and process 600. As a specific, non-limiting example, the machine-executable code 1006 may be configured to adapt the processors 1002 to perform at least a portion of the packet capture, filtering and compression functions discussed herein.

The processors 1002 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine-executable code 1006 (e.g., software code, firmware code, hardware descriptions) related to examples of the present disclosure. It is noted that a general-purpose processor (may also be referred to herein as a host processor or simply a host) may be a microprocessor, but in the alternative, the processors 1002 may include any conventional processor, controller, microcontroller, or state machine. The processors 1002 may also be implemented as a combination of computing devices, such as a combination of a DSP and a microprocessor, a plurality of microprocessors, one or more microprocessors in conjunction with a DSP core, or any other such configuration.

In some examples, the storage 1004 includes volatile data storage (e.g., random-access memory (RAM)), non-volatile data storage (e.g., Flash memory, a hard disc drive, a solid-state drive, erasable programmable read-only memory (EPROM), etc.). In some examples, the processors 1002 and the storage 1004 may be implemented into a single device (e.g., a semiconductor device product, a system on chip (SOC), etc.). In some examples, the processors 1002 and the storage 1004 may be implemented into separate devices.

In some examples, the machine-executable code 1006 may include computer-readable instructions (e.g., software code, firmware code). By way of non-limiting example, the computer-readable instructions may be stored by the storage 1004, accessed directly by the processors 1002, and executed by the processors 1002 using at least the logic circuitry 1008. Also by way of non-limiting example, the computer-readable instructions may be stored on the storage 1004, transferred to a memory device (not shown) for execution, and executed by the processors 1002 using at least the logic circuitry 1008. Accordingly, in some examples, the logic circuitry 1008 includes electrically configurable logic circuitry 1008.

In some examples, the machine-executable code 1006 may describe hardware (e.g., circuitry) to be implemented in the logic circuitry 1008 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, SystemVerilog™ or very large-scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1008 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples, the machine-executable code 1006 may include an HDL, an RTL, a GL description, a mask level description, other hardware description, or any combination thereof.

In examples where the machine-executable code 1006 includes a hardware description (at any level of abstraction), a system (not shown, but including the storage 1004) may be configured to implement the hardware description described by the machine-executable code 1006. By way of non-limiting example, the processors 1002 may include a programmable logic device (e.g., an FPGA or a PLC) and the logic circuitry 1008 may be electrically controlled to implement circuitry corresponding to the hardware description into the logic circuitry 1008. Also by way of non-limiting example, the logic circuitry 1008 may include hard-wired logic manufactured by a manufacturing system (not shown, but including the storage 1004) according to the hardware description of the machine-executable code 1006.

Regardless of whether the machine-executable code 1006 includes computer-readable instructions or a hardware description, the logic circuitry 1008 is adapted to perform the functional elements described by the machine-executable code 1006 when implementing the functional elements of the machine-executable code 1006. It is noted that although a hardware description may not directly describe functional elements, a hardware description indirectly describes functional elements that the hardware elements described by the hardware description are capable of performing.

A person having ordinary skill in the art will appreciate additional examples and advantages from the disclosure in Appendix A hereto, the entire contents and disclosure of which is incorporated herein, by this reference.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). As used herein, the term "each" means some or a totality. As used herein, the term "each and every" means a totality.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples include:

Example 1

An apparatus, comprising: a protocol control logic provided at a first sublayer of a physical layer (PHY) of a communication interface; a serializer/deserializer (SerDes) provided at a second sublayer of the PHY of the communication interface; a parallel communication system provided at the first sublayer of the PHY to couple the protocol control logic with the SerDes; and an on-chip protocol analyzer provided at the PHY and coupled with the parallel communication system to capture information about link control process data carried by the parallel communication system.

Example 2

The apparatus according to Example 1, comprising: electrical taps to couple the on-chip protocol analyzer with a pre-serialization portion of the parallel communication system and a post-deserialization portion of the parallel communication system.

Example 3

The apparatus according to any of Examples 1 and 2, wherein the first sublayer is a logical sublayer of the PHY and the second sublayer is an electrical sublayer of the PHY.

Example 4

The apparatus according to any of Examples 1 through 3, wherein link control process data comprises one or more of link training data, link initialization data, or link re-training data.

Example 5

The apparatus according to any of Examples 1 through 4, wherein the protocol control logic to perform a link control process, and wherein the link control process comprises one or more of a link training, a link initialization, and a link re-training.

Example 6

The apparatus according to any of Examples 1 through 5, wherein the protocol control logic is for one or more of: Peripheral Component Interconnect Express (PCIe), Compute Express Link (CXL), or a high-speed Universal Serial Bus (USB).

Example 7

The apparatus according to any of Examples 1 through 6, wherein the protocol control logic to implement a link control state machine.

Example 8

The apparatus according to any of Examples 1 through 7, wherein the on-chip protocol analyzer includes a capture circuitry to capture information about link control process data carried by the parallel communication system.

Example 9

The apparatus according to any of Examples 1 through 8, wherein the capture circuitry includes a record generation logic to reduce a quantity of information about link control process data.

Example 10

The apparatus according to any of Examples 1 through 9, wherein one or more first link analyzers are coupled with one or more pre-serialization portions of one or more lanes of a bus for outgoing path, and one or more second link analyzers are coupled with one or more pre-serialization portions of one or more lanes of a bus for incoming path.

Example 11

A method, comprising: receiving, at an on-chip protocol analyzer, a stream of packets being provided to or from a protocol control logic performing a link control process of a communication interface; and recording, at an on-chip storage device, information about the stream of packets.

Example 12

The method according to Example 11, comprising: filtering out a packet or category of packets that includes the packet in response to observing that the packet is irrelevant to an issue being debugged.

Example 13

The method according to any of Examples 11 and 12, comprising: filtering out a packet in response to observing that the packet or category of packet that includes the packet is insufficiently repeating.

Example 14

The method according to any of Examples 11 through 13, wherein an amount of information about the stream of packets is less than an amount of the stream of packets.

Example 15

The method according to any of Examples 11 through 14, comprising: receiving the stream of packets from a communication system of a physical layer of a communication interface coupled with the on-chip protocol analyzer.

The present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:
   a protocol control logic provided at a first sublayer of a physical layer (PHY) of a communication interface;
   a serializer/deserializer (SerDes) provided at a second sublayer of the PHY of the communication interface;
   a parallel communication system provided at the first sublayer of the PHY to couple the protocol control logic with the SerDes; and
   a protocol analyzer on-chip provided at the PHY and coupled with the parallel communication system to capture information about link control process data in a stream of packets carried to or from the protocol control logic by the parallel communication system, and record the captured information at a storage device on-chip provided at the PHY.

2. The apparatus of claim 1, comprising:
   electrical taps to couple the on-chip protocol analyzer with a pre-serialization portion of the parallel communication system and a post-deserialization portion of the parallel communication system.

3. The apparatus of claim 1, wherein the first sublayer is a logical sublayer of the PHY and the second sublayer is an electrical sublayer of the PHY.

4. The apparatus of claim 1, wherein link control process data comprises one or more of link training data, link initialization data, or link re-training data.

5. The apparatus of claim 1, wherein the protocol control logic to perform a link control process, and wherein the link control process comprises one or more of a link training, a link initialization, and a link re-training.

6. The apparatus of claim 1, wherein the protocol control logic is for one or more of: Peripheral Component Interconnect Express (PCIe), Compute Express Link (CXL), or a high-speed Universal Serial Bus (USB).

7. The apparatus of claim 1, wherein the protocol control logic to implement a link control state machine.

8. The apparatus of claim 1, wherein the on-chip protocol analyzer includes a capture circuitry to capture information about link control process data carried by the parallel communication system.

9. The apparatus of claim 8, wherein the capture circuitry includes a record generation logic to reduce a quantity of information about link control process data.

10. The apparatus of claim 1, wherein one or more first link analyzers are coupled with one or more pre-serialization portions of one or more lanes of a bus for outgoing path, and one or more second link analyzers are coupled with one or more pre-serialization portions of one or more lanes of a bus for incoming path.

11. A method, comprising:
    receiving, at a protocol analyzer on-chip provided at a physical layer (PHY), a stream of packets being provided to or from a protocol control logic performing a link control process of a communication interface; and
    recording, at a storage device on-chip, information about data of the link control process in the stream of packets from a parallel communication system of the communication interface.

12. The method of claim 11, comprising:
filtering out a packet or category of packets that includes the packet in response to observing that the packet is irrelevant to an issue related to a protocol link being debugged.

13. The method of claim 11, comprising:
filtering out a packet in response to observing that the packet or category of packet that includes the packet is insufficiently repeating.

14. The method of claim 11, wherein an amount of information about the stream of packets is less than an amount of the stream of packets.

15. The method of claim 11, comprising:
receiving the stream of packets carried between the protocol control logic and a serializer/deserializer (SerDes) by the parallel communication system of a first layer of the PHY, the communication interface coupled to the on-chip protocol analyzer.

16. The method of claim 11, wherein the protocol control logic to perform the link control process, and wherein the link control process comprises performing one or more of a link training, a link initialization, or a link re-training.

17. The method of claim 16, wherein the stream of packets received at the on-chip protocol analyzer includes link control process data carried between the protocol control logic and a serializer/deserializer (SerDes) of a second sublayer of the PHY.

18. The method of claim 17, wherein the link control process data includes one or more of: link training data, link initialization data, or link re-training data.

19. The method of claim 11, wherein the protocol control logic is for one of:
a Peripheral Component Interconnect Express (PCIe), a Compute Express Link (CXL), or a high-speed Universal Serial Bus (USB).

20. The method of claim 11, comprising:
reducing a quantity of information about the stream of packets.

21. The method of claim 20, wherein the recording, at the on-chip storage device, information about the stream of packets comprises:
recording, at the on-chip storage device, the reduced quantity of information about the stream of packets.

22. The method of claim 20, wherein the reducing the quantity of information about the stream of packets comprises:
reducing a quantity of information about the stream of packets recorded at the on-chip storage device.

\* \* \* \* \*